US006148120A

United States Patent [19]

Sussman

[11] Patent Number: 6,148,120
[45] Date of Patent: Nov. 14, 2000

[54] WARPING OF FOCAL IMAGES TO CORRECT CORRESPONDENCE ERROR

[75] Inventor: Michael Sussman, Winchester, Mass.

[73] Assignee: Cognex Corporation, Natick, Mass.

[21] Appl. No.: 08/961,404

[22] Filed: Oct. 30, 1997

[51] Int. Cl.[7] .................................................. G06K 9/32
[52] U.S. Cl. .......................................... 382/293; 154/255
[58] Field of Search .................................... 382/284, 255,
382/154, 153, 294, 293, 106, 263, 289–299;
356/376, 375, 394, 400–401, 2–3, 3.01;
359/368, 629; 348/135; 250/559.22, 201.4–201.6,
201.7, 559.31, 559.23, 559.38, 227.2, 307;
378/98

[56] References Cited

U.S. PATENT DOCUMENTS

| 4,472,056 | 9/1984 | Nakagawa et al. | 356/376 |
| 4,640,620 | 2/1987 | Schmidt | 356/376 |
| 4,661,986 | 4/1987 | Adelson | 382/154 |

(List continued on next page.)

FOREIGN PATENT DOCUMENTS

| 0 183 240 A2 | 6/1986 | European Pat. Off. | G01B 11/02 |
| 0 300 164 A1 | 1/1989 | European Pat. Off. | G01B 11/31 |
| 0 563 829 A2 | 10/1993 | European Pat. Off. | G01R 31/308 |
| 0 627 610 A1 | 12/1994 | European Pat. Off. | G01B 11/02 |
| 3413605 A1 | 10/1985 | Germany | G01B 4/24 |
| 3-63507 | 8/1989 | Japan | G01B 11/24 |
| 9-26312 | 8/1989 | Japan | G01B 11/24 |
| 4-283608 | 3/1991 | Japan | G01B 11/24 |
| 4-313008 | 4/1991 | Japan | G01B 11/24 |
| 6-249632 | 2/1993 | Japan | G01B 11/24 |
| 7-311025 | 5/1994 | Japan | G01B 11/24 |
| 8-233544 | 2/1995 | Japan | G01B 11/24 |
| 9-5046 | 6/1995 | Japan . | |
| 8-152308 | 9/1995 | Japan | G01B 11/24 |
| 8-304043 | 9/1995 | Japan | G01B 11/24 |
| 9-96512 | 9/1995 | Japan | G01B 11/24 |
| 9-127420 | 11/1995 | Japan | G02B 21/00 |
| WO 96/41304 | 12/1996 | WIPO | G06K 9/74 |

OTHER PUBLICATIONS

Darrell et al. Pyramid based depth from focus, Computer Vision and Pattern Recognition, pp. 504–509, Jun. 5, 1988.
A. Pentland, S. Scherock, T. Darrell, and B. Girod. "Simple range cameras based on focal error," J. Opt. Soc. Am. A., vol. 11, No. 11, Nov. 1994, pp. 2925–2934.
B. Girod, and S. Scherock "Depth from Defocus of Structured Light," SPIE vol. 1194 Optics, Illumination, and Image Sensing for Machine Vision IV (1989), pp. 209–215.
P. Caber, "Interferometric profiler for rough surfaces," Applied Optics, vol. 32, No. 19, Jul. 1, 1993, pp. 3438–3441.
S. Nayar and Y. Nakagawa, "Shape from Focus," IEEE Transactions on Pattern Analysis and Machine Intelligence, vol. 16, No. 8, Aug. 1994, pp. 824–830.
Y. Xiong and S. Shafer, "Depth from Focusing and Defocusing," Proc. IEEE Conference on Computer Vision and Pattern Recognition 1993, pp. 68–73.
J. Wyant, "How to extend interferometry for rough surface tests," Laser Focus World, Sep. 1993, pp. 131–133.
J.-A. Beraldin, M. Rioux, F. Blias, and R. A. Couvillon, "Digital Three–dimensional Imaging in the Infrared at the National Research Council of Canada," SPIE vol. 2269 Infrared Technology XX (1994), pp. 208–225.

(List continued on next page.)

Primary Examiner—Leo H. Boudreau
Assistant Examiner—Ishrat Sherali
Attorney, Agent, or Firm—Russ Weinzimmer

[57] ABSTRACT

The invention corrects correspondence error among multiple images taken at different focal distances with non-telecentric optical systems, and is particularly useful in focal gradient analysis range imaging systems.

10 Claims, 6 Drawing Sheets

U.S. PATENT DOCUMENTS

| | | |
|---|---|---|
| 4,689,480 | 8/1987 | Stern .................................... 250/201.4 |
| 4,876,455 | 10/1989 | Sanderson et al. ................. 250/559.22 |
| 4,893,183 | 1/1990 | Nayar ...................................... 348/135 |
| 4,912,336 | 3/1990 | Nayar et al. ........................ 250/559.17 |
| 4,965,840 | 10/1990 | Subbarao ................................ 382/106 |
| 4,984,893 | 1/1991 | Lange ..................................... 356/376 |
| 4,988,202 | 1/1991 | Nayar et al. ........................... 356/394 |
| 5,151,609 | 9/1992 | Nakagawa et al. ................. 250/559.22 |
| 5,187,754 | 2/1993 | Currin et al. ........................... 382/284 |
| 5,193,124 | 3/1993 | Subbarao ................................ 382/255 |
| 5,239,178 | 8/1993 | Derndinger et al. .................... 250/234 |
| 5,248,876 | 9/1993 | Kerstens et al. ................... 250/559.05 |
| 5,424,835 | 6/1995 | Cosnard et al. ......................... 356/376 |
| 5,546,189 | 8/1996 | Svetkoff et al. ........................ 356/376 |
| 5,589,942 | 12/1996 | Gordon ................................... 356/376 |
| 5,617,209 | 4/1997 | Svetoff et al. .......................... 356/376 |
| 5,654,547 | 8/1997 | Coene et al. ........................... 250/307 |
| 5,657,402 | 8/1997 | Bender et al. .......................... 382/284 |
| 5,659,420 | 8/1997 | Wakai et al. ............................ 359/368 |
| 5,793,900 | 8/1998 | Nourbaksh et al. .................... 382/263 |
| 5,878,152 | 3/1999 | Sussman ................................. 382/106 |
| 5,912,768 | 6/1999 | Sissom et al. .......................... 359/629 |
| 5,917,936 | 6/1999 | Katto ...................................... 382/154 |
| 6,025,905 | 2/2000 | Sussman ................................ 356/3.01 |

OTHER PUBLICATIONS

Z.J. Geng, "Rainbow three–dimensional camera: new concept of high–speed three–dimensional vision systems," Optical Engineering, vol. 35 No. 2, Feb. 1996, pp. 376–383.

M. Watanabe and S. Nayar, "Telecentric Optics for Constant-Magnification Imaging," Technical Report CUCS–026–95, Dept. of Computer Science, Columbia University, New York, NY, USA, Sep. 1995.

M. Watanabe, S. Nayar, and M. Noguchi, "Active Focus Range Sensor," Implementation Technical Note, Dept. of Computer Science, Columbia University, New York, NY, USA, Jun. 1995.

M. Watanabe, S. Nayar, and M. Noguchi, "Real–time computation of depth from defocus," Proc. of SPIE v 2599, 1996, pp.14–25.

S. Nayar, M. Watanabe, and M. Noguchi, "Real–Time Focus Range Sensor," IEEE Transactions on Pattern Analysis and Machine Intelligence, vol. 18, No. 12, Dec. 1996, pp. 1186–1198.

M. Noguchi and S. Nayar, Microscopic Shape from Focus Using Active Illumination, Proc. IEEE Conference on Computer Vision and Image Processing 1994, pp. 147–152.

M. Subbarao and G. Surya, "Depth from Defocus: A Spatial Domain Approach," International Journal of Computer Vision, 13, 3, 1994, pp. 271–294.

R. Stone and S.Shafer, "Surface Roughness Estimation," The Robotics Institute, Carnegie Mellon University, Pittsburgh, PA, USA.

A. Pentland, "A New Sense for Depth of Field," IEEE Transactions on Pattern Analysis and Machine Intelligence, vol. PAMI–9, No. 4, Jul. 1987, pp. 523–531.

M. Ishihara and H. Sasaki, "High Speed 3–D Shape Measuring Apparatus using Shape from Focus Method," Seimitsu Kogaku Kaishi (Precision Engineering Journal), vol. 63, No. 1, 1997, pp. 124–128.

"Confocal Microscopy," Optical Instruments, pp. 17.40–17.43.

R. Webb, "Confocal Microscopes," Optics & Photonics News, Jul. 1991, pp. 8–13.

R. Schneider, A. Schick, P. Kollensperger, and T. Ninomiya, "High–speed optical three–dimensional scanner for automatic solder joint inspection," Optical Engineering, vol. 36, No. 10, Oct. 1997, pp. 2878–2885.

M. Ishihara, "High Speed 3–D Shape Measurement for a Small Object," Dai Ni–kai Gazou Senshing Shinpojiumu Kouen Ronbunshuu (Collection of the Lectures at the 2nd Image Sensing Symposium), Jun. 1996, pp. 155–158.

M. Ishihara and H. Sasaki, "High Speed 3–D Shape Measurement Using Non–Scanning Multibeam Confocal Lens System," Dai San–kai Gazou Senshing Shinpojiumu Kouen Ronbunshuu (Collection of the Lectures at the 3rd Image Sensing Symposium).

T. Yamashita and H. Nakashima; M. Nagashima and K. Nishiuchi, "Measuring longitudinal displacements using laser beam diffration changes near the focal point," Rev. Sci. Instrum., vol. 64, No. 8, Aug. 1993, pp. 2245–2249.

Patent Abstracts of Japan, vol. 8, No. 6 (P–247) '1443!, Jan. 12, 1984 & JP 58 169008 A (Nippon Denki K.K.), Oct. 5, 1983.

WARPING OF FOCAL IMAGES TO CORRECT CORRESPONDENCE ERROR

FIELD OF THE INVENTION

This invention relates to machine vision, and particularly relates to 3-D machine vision techniques, such as depth-from-focus and depth-from-defdefocus techniques for range imaging.

BACKGROUND OF THE INVENTION

In standard 2-D machine vision, a video camera and frame grabber are used to acquire a digital image of an object or scene to be stored in computer memory. A computer then analyzes the image to inspect or orient the object, read identifying marks, etc. In many applications, standard light intensity images do not provide sufficient information for the machine vision task. For example, when inspecting solder bumps on semiconductor packages, it is necessary to gauge (measure) bump height to determine coplanarity of a plurality of bumps and perhaps the solder volume of each bump. Due to the scale and speed requirements of such applications, non-contact gauging methods are preferred. Thus, a 3-D range image is desired, wherein each range image element is a range (height) measurement instead of a 2-D reflectance image, wherein each reflectance image element (pixel) is a reflectance or brightness measurement.

Range images can be obtained by many methods. An important class of methods combines multiple 2-D video camera images to obtain a range image, such as in stereo vision. Another technique using 2-D images involves comparison of the degree of focus or defocus in two or more images taken at different distances from the object under inspection. In this class of methods, the depth of field characteristic of the imaging lens is used to determine range. For example, Nayer and Nakagawa in "Shape from Focus", IEEE trans. Pattern Analysis and Machine Vision, vol. 16, no.8, pp.824–831, August 1994, describe a depth from focus system using multiple images taken with different camera to object distances. In S. K. Nayer, M. Watanabe, M Nougouchi, "Real-Time Focus Range Sensor", IEEE trans. Pattern Analysis and Machine Vision, vol. 18, no.12, pp.1186–1196, December 1996, a depth from defocus system is described using the relative degree of defocus in two images taken at different focal distances to compute a range image.

To compare the degree of focus or defocus at a point on an object using multiple images of the object, each point on the object must be precisely located at the same position in each of the images. In other words, the depth from focus and defocus techniques require that the set of multiple images of the object have point-to-point correspondence. However, conventional imaging optics change magnification as focal distance changes, and consequently, exact point-to-point correspondence among the images does not occur. M. Watanabe and S. K. Nayer in "Telecentric Optics for Constant-Magnification Imaging", Report CUCS-026–95, Department of Computer Science, Columbia University, New York, N.Y., September 1995, have suggested use of telecentric optics to overcome this problem. Telecentric optics provides a constant magnification over depth of field. Watanabe and Nayer also suggests a procedure for converting a normal lens so as to provide telecentric operation by adding an external aperture.

Although the use of perfectly telecentric lenses solves the correspondence problem in depth from focus and defocus systems, the use of such telecentric lenses has many drawbacks. For example, adding an external pupil to a regular lens to obtain telecentric operation creates a vignetting condition. This is due to rays being unequally clipped by the external aperture over the lens field of view, and is equivalent to the lens f/# changing over field. The consequence of this is that lens depth of field changes over field of view, thereby changing the range detection function locally over the images. Such effects are difficult or impossible to remove by calibration procedures. To overcome this problem, a custom lens or lens attachment can be designed. However, custom optics are expensive to produce. Also, fully telecentric lens system designs are fixed at a single set of operating conjugates, so that field of view (magnification) is fixed. This is very limiting in machine vision applications, where a single sensor must be useful over a range of object sizes.

Image warping has been suggested as a means of correcting for non-correspondence among a set of images in range imaging applications. Here, "image warping" is defined as any image transformation which alters the spatial relationship between points in an image. In the case of correction of correspondence error due to magnification shift, the required transformation (warp) includes the operations of translation and scaling. In the correction of a set of 'n' images, 'n-1' images would be scaled and translated to match a chosen image in the set, to provide a final set of 'n' images with precise geometric correspondence.

In depth from focus and depth from defocus systems, it is the image components of highest spatial frequency which convey precise focal information. For example, Nougouchi and Nayer in "Microscopic Shape from Focus Using Active Illumination", 12the Proceedings IAPR International Conference on Pattern Recognition, pp.147–152, Jerusalem, Israel, October, 1994, have suggested the use of high frequency structured illumination to superimpose high frequency texture on objects otherwise devoid of such natural surface texture. Using this method, the needed high frequency components are always present. Image warping requires the resampling of image picture elements to alter the spatial relationship between the elements. This involves the use of interpolating filters to generate new pixels lying between pixels on the original sampling grid, a process which unavoidably results in high frequency image information loss, as described in Wolberg, G., "Digital Image WNarping", IEEE Computer Society Press, Los Alamitos, Calif., 1990. This loss is of precisely those image frequency components needed for accurate focal analysis in depth from focus and depth from defocus methods. Inrterpolating filter fidelity can be improved by using filters with larger kernel extent, but this approach is computationally expensive. Therefore, the use of image warping for correspondence correction has been judged impractical by past investigators.

SUMMARY OF THE INVENTION

Given a set of focal images taken at different focal distances using non-telecentric optics, and consequently lacking exact geometric correspondence, the invention provides a set of precisely corresponding focal images for use in depth from focus and depth from defocus range image systems. This is accomplished through the warping of a subset of the focal images. Focal images are produced by processing a normal reflectance image using a computational focus measure, and have limited high frequency content. Thus, as recognized by the invention, the warping operation is advantageously applied after the high frequency image components critical to focus estimation have been processed. An aspect of the invention has been implemented as part of a depth from focal gradient analysis system, such as a depth from focus/defocus sensor, and has been shown to permit the use of simple and computationally efficient image resampling methods, while also yielding accurate results. Another aspect of the invention is a depth from focal gradient analysis system that incorporates warping to achieve image correspondence among a plurality of focal images.

Additionally, the invention eliminates the need for telecentric optics in a depth from gradient analysis range imaging system, which is advantageous because telecentric optics can be costly and can impose limitation on system adjustability.

BRIEF DESCRIPTION OF THE DRAWING

The invention will be more fully understood from the following detailed description, in conjunction with the accompanying figures, wherein.

DETAILED DESCRIPTION OF THE DRAWINGS

Figure 1A:
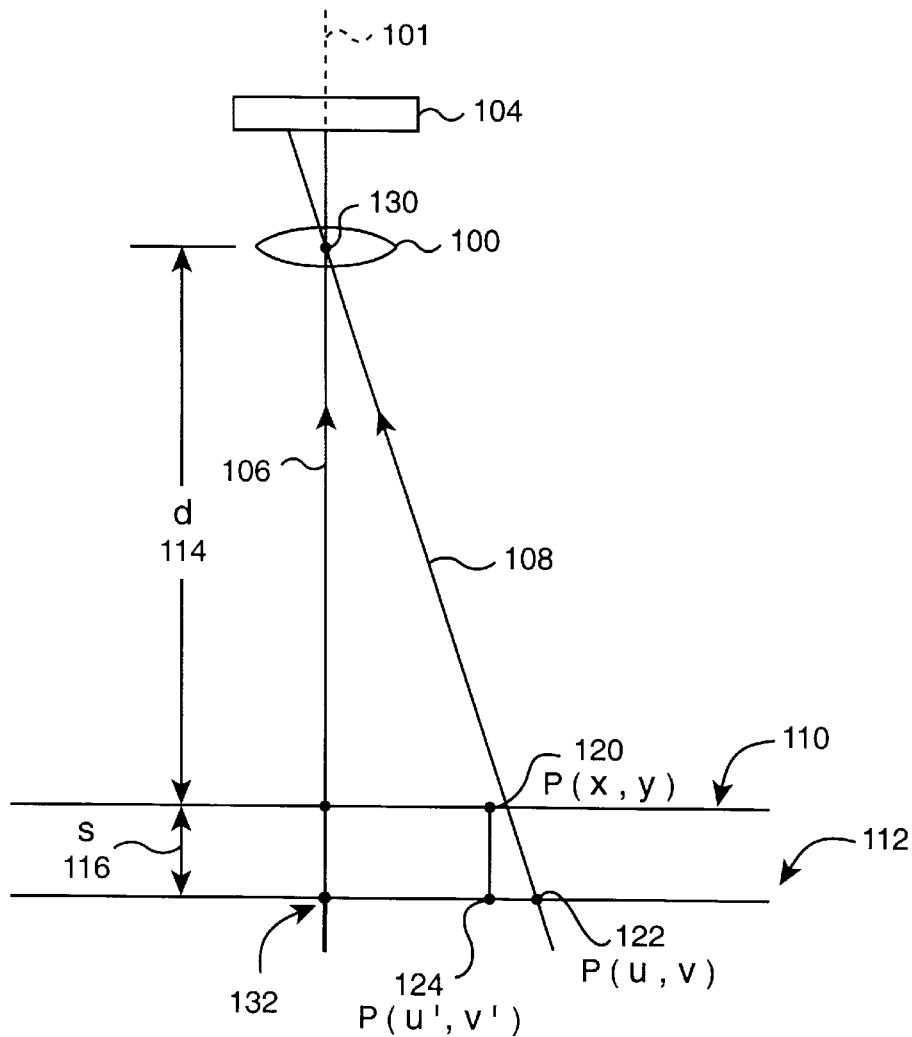
FIG. 1A is a ray diagram of an optical system of a range sensor showing the geometric cause of correspondence errors.

FIG. 1 depicts the geometric cause of correspondence error in the optical system of a range sensor. In FIG. 1, lens 100 focuses an image of an object at near focal plane 110, or at far focal plane 112, onto an imaging detector 104. Detector 104 is preferably an area array CCD image sensor incorporated into a video camera, but may also be any type of area or line-scan sensor. Ray 106 lies along the central axis 101 of the optical system, passing through the center of the sensing area of detector 104, the center of lens 100, and establishing the center of the field of view at near focal plane 110, and far focal plane 112.

Ray 108 impinges upon a point away from the center of the sensing area of detector 104 and passes through the center of lens 100. In the following discussion, coordinates (x,y) lie on near focal plane 110, while coordinates (u,v) lie on far focal plane 112. Ray 108 intersects near focal plane 110 at point 120, which we label P(x,y). Ray 108 intersects far focal plane 112 at point 122, which we label P(u,v).

In a depth from defocus system, range to an object is computed on a point-by-point basis by comparing the degree of focus in each of two images of an object at two respective focal distances. In FIG. 1A, for example, the first image is taken of the object at the near focal plane 110, and the second image is taken of the object at the far focal plane 112. The distance between near focal plane 110 and far focal plane 112 is termed focal separation, and is labeled 's' 116 in FIG. 1A. In practice, many methods can be employed to produce the focal separation, such as physically moving the object, as in the example above, changing optical path length, or employing multiple sensors. The distance from lens 100 to the near focal plane 110 is termed the working distance, and is labeled 'd' 114 in FIG. 1A. A simple lens 100 is shown in FIG. 1A. For practical lenses, 'd' is measured from the principal point of the lens.

Since ray 106 lies on the central axis 101 of the optical system, a point on an object intersecting ray 106 will appear at the same place in images taken at position 110 or 112. This is not true for other points in the images, since the light captured by lens 100 is not collimated. Ray 108 passing through a point P(x,y) 120 on the object, at focal plane 110, will pass through a different point P(u,v) 122 on the same object, when located at focal plane 112. Since ray 108 originates at the same point on the sensor for both P(x,y) and P(u,v), different points on the object appear at the same (non-center) location in images taken at positions 110 and 112. This correspondence error is thus due to the change of optical magnification with distance, and increases radially from the central axis 101 of the system.

The correspondence error for any point on far focal plane 112 can be found from similar triangles in FIG. 1A. Point P(u',v'), 124 in FIG. 1A, lies on the same point on the object as point P(x,y), 120 in the figure. However, point P(u,v), 122, will appear in the sensor 104 images at the same position as P(x,y). The correspondence error of P(u,v) can be geometrically decomposed and is here termed e(u) and e(v). From FIG. 1A, the correspondence error components are given by equations 1A and 1B:

$$e(u)=u-u' \tag{1A}$$

$$e(v)=v-v'. \tag{1B}$$

The error e(u) and e(v) can be visualized in FIG. 1A as the distance from P(u,v), 122 to P(u',v'), 124. Note that similar triangles are formed in the figure from points 130, 132, 122 and points 120, 124, 122. Thus, by proportion, i.e., s / (d+s)=(u-u')/u, and by substitution of equations 1A and 1B, we obtain equations 2A and 2B:

$$e(u)=u*s/(d+s) \tag{2A}$$

$$e(v)=v*s/(d+s) \tag{2B}$$

Figure 1B:
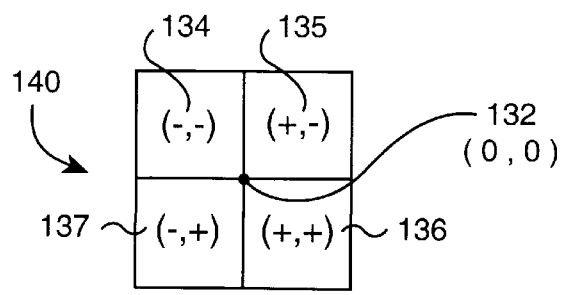
FIG. 1B shows a graphical representation of a field of view, divided into quadrants, each quadrant labeled by the signs of the coordinates therein.

Equations 2A and 2B assume that the intersection of central ray 106 with the focal plane 112 is the center of field 132, thereby defining the (u,v) coordinate position (0,0). FIG. 1B shows a plane view of focal planes 110 and 112. In calculating the correspondence error in conjunction with FIG. 1A and the above equations, certain coordinate sign conventions must be observed, as shown in FIG. 1B. The rectangle 140 in FIG. 1B is the entire field of view of sensor 104 in FIG. 1A. The quadrants 134, 135, 136, and 137 of the field of view are associated with (u,v) coordinate sign (−,−) at 134, (+,−) at 135, (+,+) at 136, and (−,+) at 137.

The calculation of the correspondence error does not take into account height variations of the object. Such surface relief is by definition unknown, since this is the property being measured. Thus, height variations unavoidably produce a residual error of the calculated correspondence error. The maximum residual error is equal to s/(d+s) of the correspondence error itself. This results from the fact that the working distance, d, varies directly with object relief, while focal separation, s, is constant with object relief. The maximum surface relief measurable in depth from defocus is equal to s, so that d becomes d+s with maximum height variation. For working systems, d is many times larger than s. A preferred system has total field of view of 20 mm per side, focal separation s=1 mm, and working distance d=100 mm. The maximum correspondence error, from above, will be 0.1 mm. If we assume that the image sensor has 1000 pixels per axis, this is equivalent to a 5 pixel correspondence error. If the object has the maximum surface relief of 1 mm, the calculated error will itself have a maximum error of 0.001 mm, or 0.05 pixels. Thus, in practice, the residual error is small enough to disregard.

In this invention, image warping is used to alter the spatial relationship of points in one or more focal images to ensure geometric correspondence between the images. An image warp is composed of two fundamental processes: mapping and resampling. In mapping, the spatial relationship between the input image coordinates and warped (output) image coordinates is established. In resampling, image values interpolated from pixels of the input image are written to corresponding locations in the output image according to the mapping. The calculation of the correspondence error, given above, permits a mapping to be established between points in 'n' images taken of an object at 'n' different focal positions. This mapping is then used to resample n-1 images, so that the resulting set of 'n' images all have point-to-point geometric correspondence. A novel feature of this invention is that the resampling is performed on focal images. Focal images are reflectance images which have been processed by a focus operator.

Figure 2:
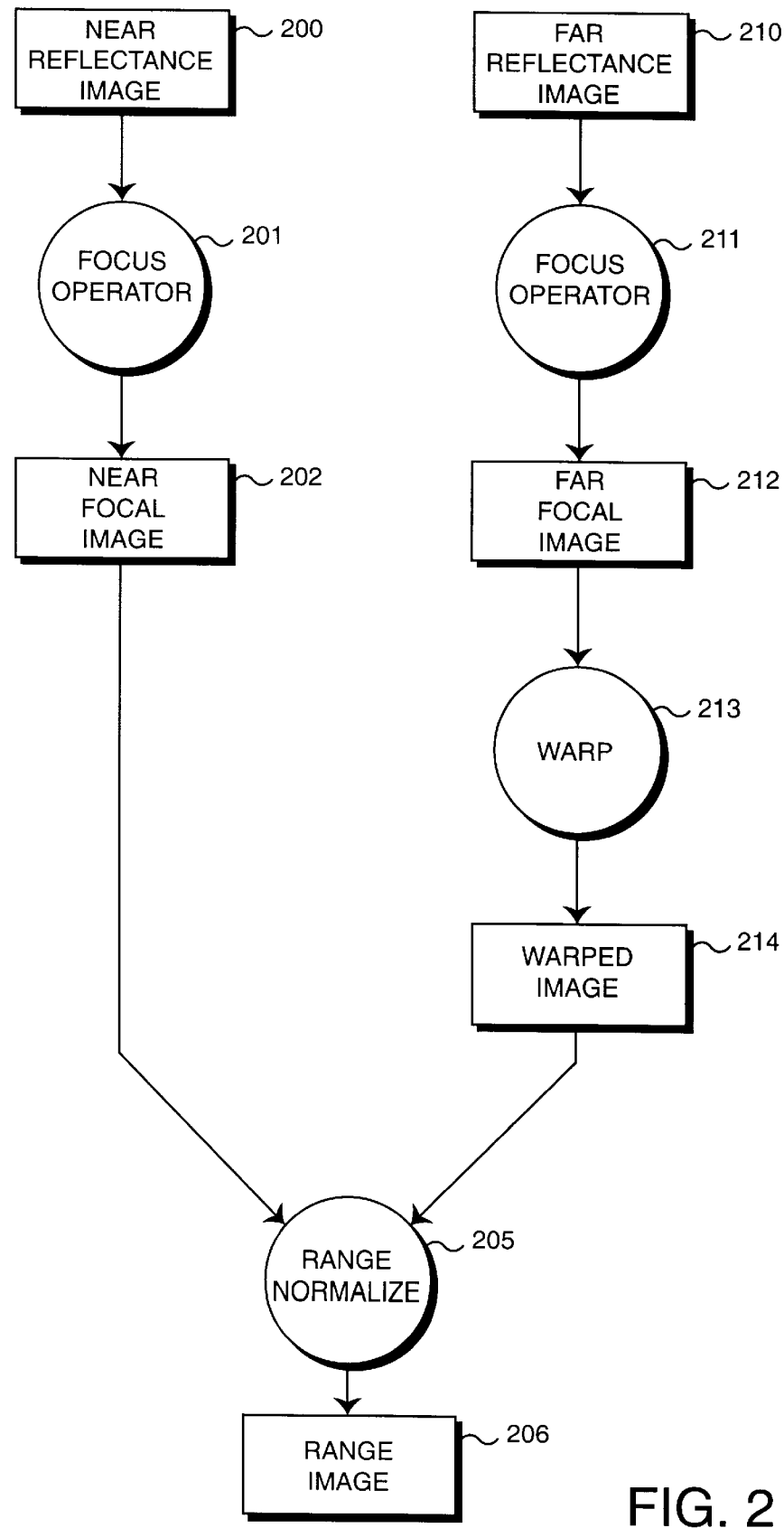
FIG. 2 is a flow chart showing the processing operations used to compute range image from two reflectance images.

FIG. 2 shows the processing operations of the invention used to compute a range image using the depth from defocus technique with focal image correspondence correction by image warping. In FIG. 2, near reflectance image 200 is a reflectance image taken with the object at near position 110 according to FIG. 1A. Near reflectance image 200 may also be a pre-processed object image, according to co-pending application Ser. No. 08/859,854, filed may 20, 1997, entitled "Depth From Focal Gradient Analysis Using Object Texture Removal by Albedo Normalization", herein incorporated by reference.

Also in FIG. 2, image 210 is a far reflectance image, taken with the object at position 112 according to FIG. 1A. Far reflectance image 210 may also be pre-processed. Each image 200, 210 is processed with focus operator 201, 211, to produce a pair of focal images, 202 and 212. The focus operator 201,211 determines the local degree of image sharpness across an image, using a neighborhood differencing operator.

Note that the concept of image sharpness cannot be applied to a single picture element (pixel) in an image. Rather, image sharpness is a function of contrast between a pixel and its neighbors. Typical focus operators include the RMS operation and the tuned focus operator, as described in co-pending application Ser. No. 08/859,854, filed May 20, 1997, entitled "Depth From Focal Gradient Analysis Using Object Texture Removal by Albedo Normalization". A common property of these neighborhood operators is that they produce images with reduced high spatial frequency content. This property makes the invention robust to small errors of the resampling operation.

In FIG. 2, far focal image 212 is processed with image warp 213 to produce warped focal image 214. Image 214 exhibits point-to-point geometric correspondence with near focal image 202. Focal image 212 is preferably warped instead of image 202, since the far image 212 shows more of the object. The scaling operation applied in the warp is then an enlargement (zoom) function. If image 202 were instead warped, a reduction of the size of the near image 200 would be required, which would produce a region bordering the warped image with no usable data. This is undesirable. Corresponding images 202 and 214 are then processed by a range normalization function 205 to produce a range image 206, as detailed in co-pending application Ser. No. 08/859,854, filed May 20, 1997, entitled "Depth From Focal Gradient Analysis Using Object Texture Removal by Albedo Normalization".

Figure 3:
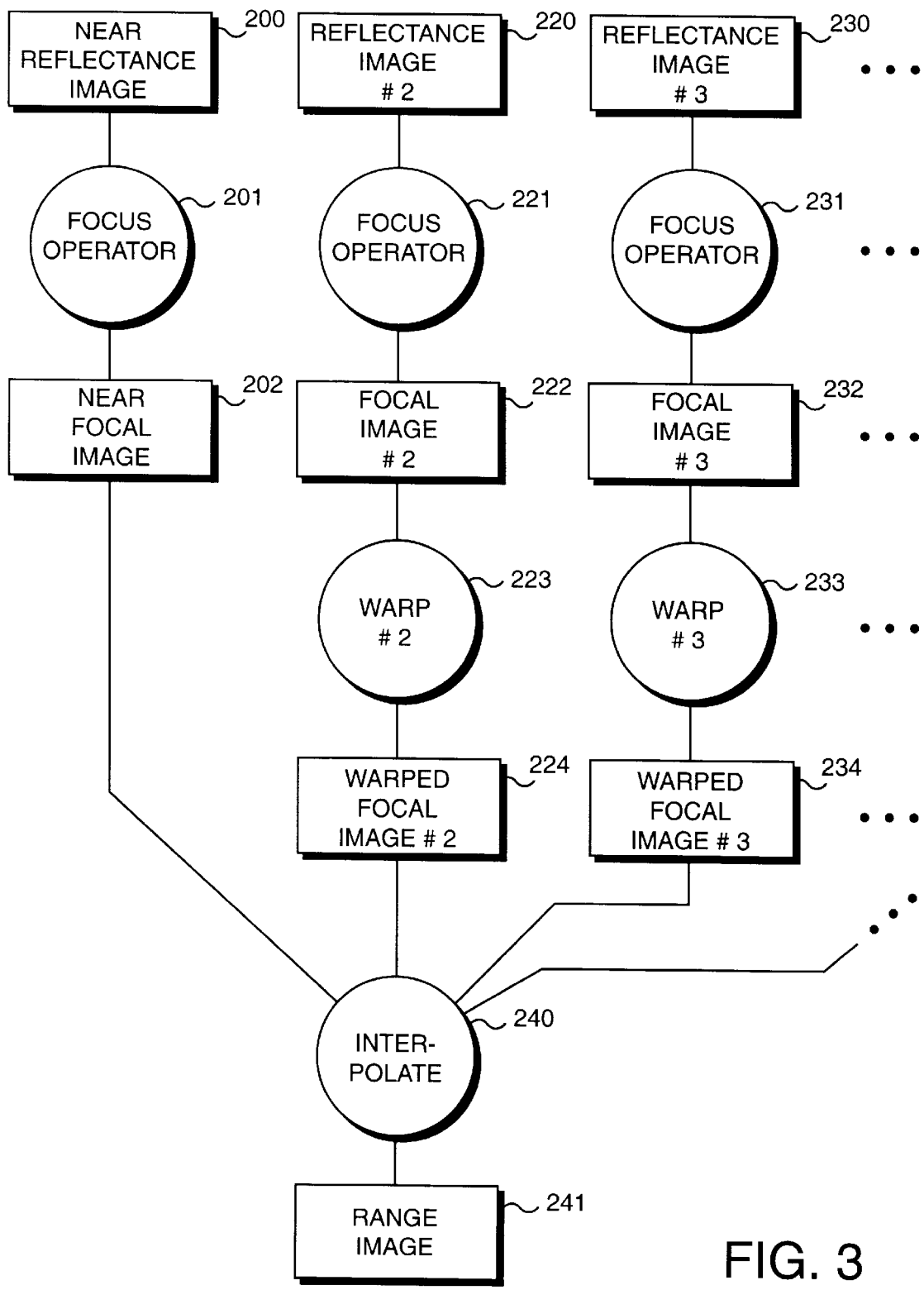
FIG. 3 is a flow chart showing the processing operations used to compute range image from 'n' reflectance images.

FIG. 3 shows the processing operations used in computing a range image using the depth from focus technique with focal image correspondence correction by image warping according to the invention. In depth from focus, the object is moved through more than two positions. The images so obtained are used to find the point of best focus for each location on the object, and thus its location along the z axis (range) relative to the lens. To reduce the number of images, and thereby reduce acquisition time required, interpolation methods are used to estimate the position of best focus between a few successive images. In FIG. 3, processing at three object positions is shown, but it should be understood that this method can be extended to process as many images as desired, as indicated by the ellipsis ( . . . ) in the figure.

In FIG. 3, reflectance images 200, 220 and 230 are obtained as in FIG. 1A. In FIG. 3, image 200 is taken at position 110 in FIG. 1A, while each image 220 and 230 of FIG. 3 are at 112 in FIG. 1A, but with the parameter 's' 116 in FIG. 1 increasing for each successive image. Images 200, 220, 230 may be pre-processed images, according to co-pending application Ser. No. 08/859,854, filed May 20, 1997, entitled "Depth From Focal Gradient Analysis Using Object Texture Removal by Albedo Normalizzation". Focal images 202, 222, 232 are processed from 200, 220 and 230 in the figure. The farther focal images 222, 232 are then warped, 223, 233, to obtain warped focal images 224, 234 with geometric correspondence to near focal image 202. The images 202, 224, 234 are then processed into a range image 241, preferably using an interpolation method 240 such as Gaussian fitting. An example of such fitting is given by Nayer, S. K. and Nakagawa Y., "Shape From Focus", IEEE Trans. On Pattern Analysis and Machine Intelligence, pp. 824–831, vol. 16. No 8, August 1994, herein incorporated by reference.

Figure 4:
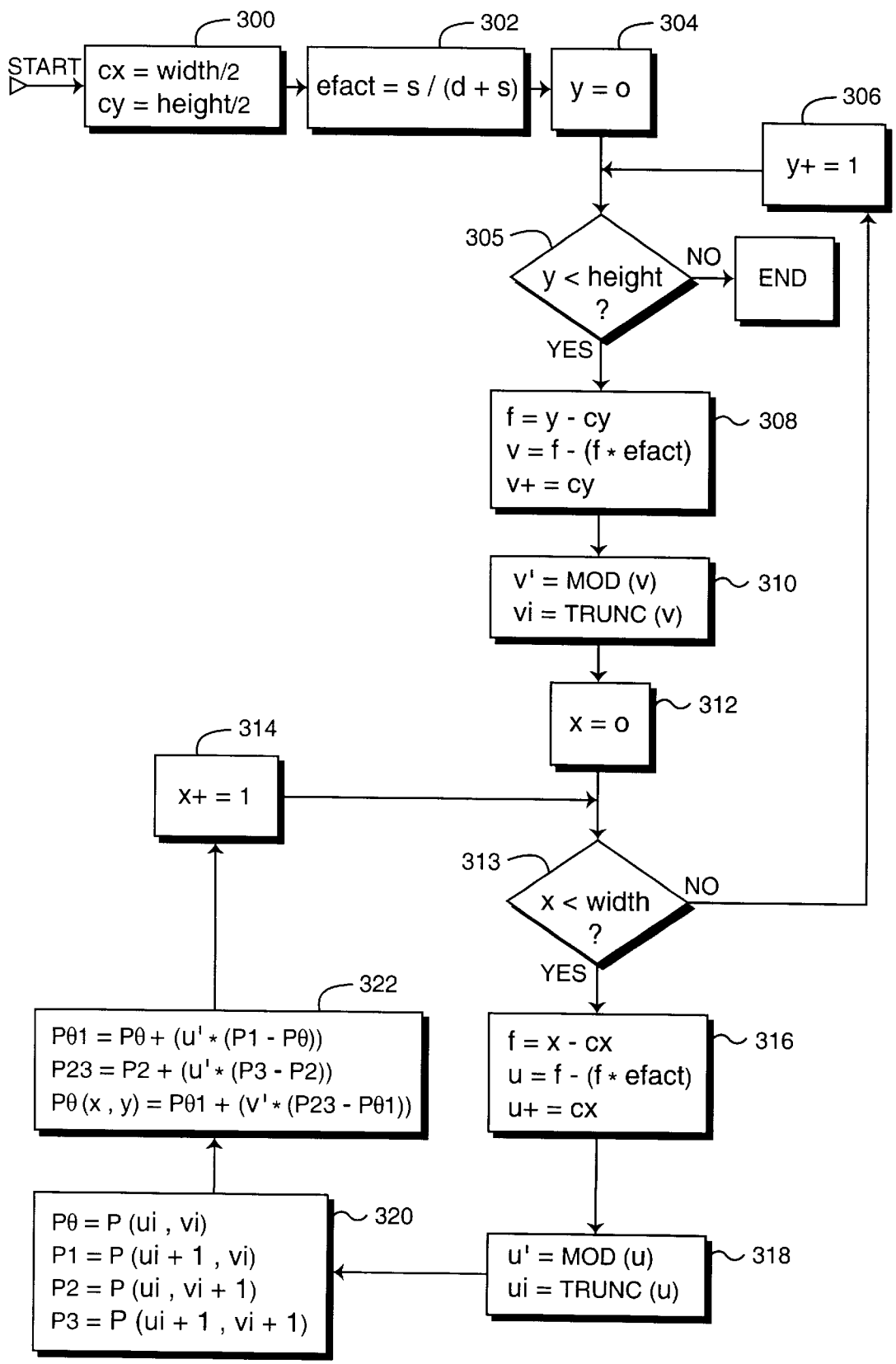
FIG. 4 is a flowchart showing a preferred method of image warping according to the invention to obtain focal image correspondence.

FIG. 4 is a flowchart which illustrates a preferred method of image warping to obtain focal image correspondence. In this method, the mapping is computed on a point-by-point basis, using a reverse mapping technique. In reverse mapping, pixels are generated in the order needed to progressively write the output image. Thus, the mapping locates the point in the input image which corresponds to a particular point about to be generated for output. The reverse mapping is precisely given by the quantities e(u) and e(v) and found by equations 2A and 2B, as developed above in conjunction with FIG. 1A. The point in the input image thus found generally lies off of the regular (integer) grid of pixel locations. Interpolation is used to resample the input data, so that a new pixel is generated lying between pixels on the original input image sampling grid, as discussed in conjunction with FIG. 5, below.

In FIG. 4, block 300 is used to store the center coordinate (cx=width/2, cy=height/2) of the output image for convenience in transforming regular image coordinates to field coordinates, using the coordinate and mapping conventions set forth in FIG. 1B. Block 302 computes the error factor 'efact'=s/(d+s), used to compute correspondence error. Note that the error factor is dimensionless, so that pixel units may be corrected without requiring that image scale be known.

Blocks 304, 305, 306 setup a for-loop such that all y coordinates in the output image are visited.

In block 308, the 'v' ordinate of the mapping is found. First, the output 'y' ordinate is converted to field ordinate 'f', so that the on-axis condition at point 132 in FIG. 1A corresponds to zero. The input ordinate 'v' corresponding to output ordinate 'y' is found from the field ordinate 'f' by computing the correspondence error e(v)=f*efact and subtracting it from the field ordinate 'f'. Ordinate 'v' is then translated back to regular pixel coordinates to complete mapping block 308.

In block 310, input ordinate 'v' is split into fractional part 'v'' using a modulus operator, and integer part 'vi' using a truncation operator. The integer part 'vi' is used to address the neighborhood of pixels surrounding 'v' in the input image. The fractional part, 'v'', is then used to specify the interval between neighbors in interpolating a pixel to store in the output, as detailed in conjunction with FIG. 5, below.

Blocks 312, 313, 314 setup a for-loop such that all 'x' coordinates in the output image are visited. In blocks 316 and 318, the 'u' ordinate of the mapping is found and split into whole and fractional components 'u'' and 'ui' using the same operations as in blocks 308 and 310. In block 320, four pixels in the input and neighboring P(u,v) are read from the input image. In block 322, an output pixel is resampled from the four input pixels using bilinear interpolation, and is written to the output.

Figure 5:
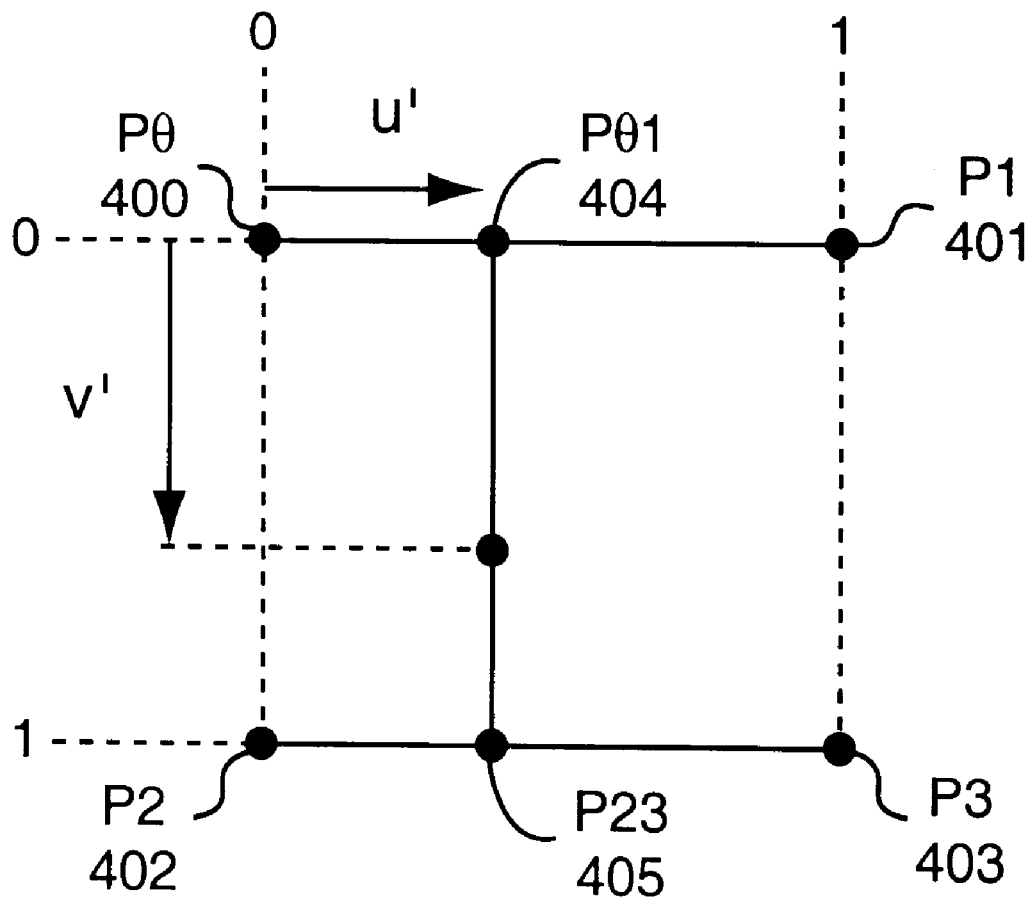
FIG. 5 is a graphical representation of four neighboring pixels upon which the separable bilinear interpolation block of FIG. 4 operates so as to provide an interpolated point.

FIG. 5 shows the details of the separable bilinear interpolation block 322 in FIG. 4. The four pixels neighboring P(u,v) which were read in block 320 of FIG. 4 are shown in FIG. 5 at 400, 401, 402, 403. Using the fractional interval 'u'', where 0<=u'<1, two new points P01 404, and P23 405 are found using linear interpolation. In the final step of block 322, pixel P 406, is found by linear interpolation from P01 and P23 using the fractional interval 'v''. The three linear interpolation steps represented in FIG. 5 are programmed in block 322 of FIG. 4. Note that if the output pixel P lies directly on the input pixel P0, then P0 will be written directly to the output pixel P without modification by this method.

Figure 6:
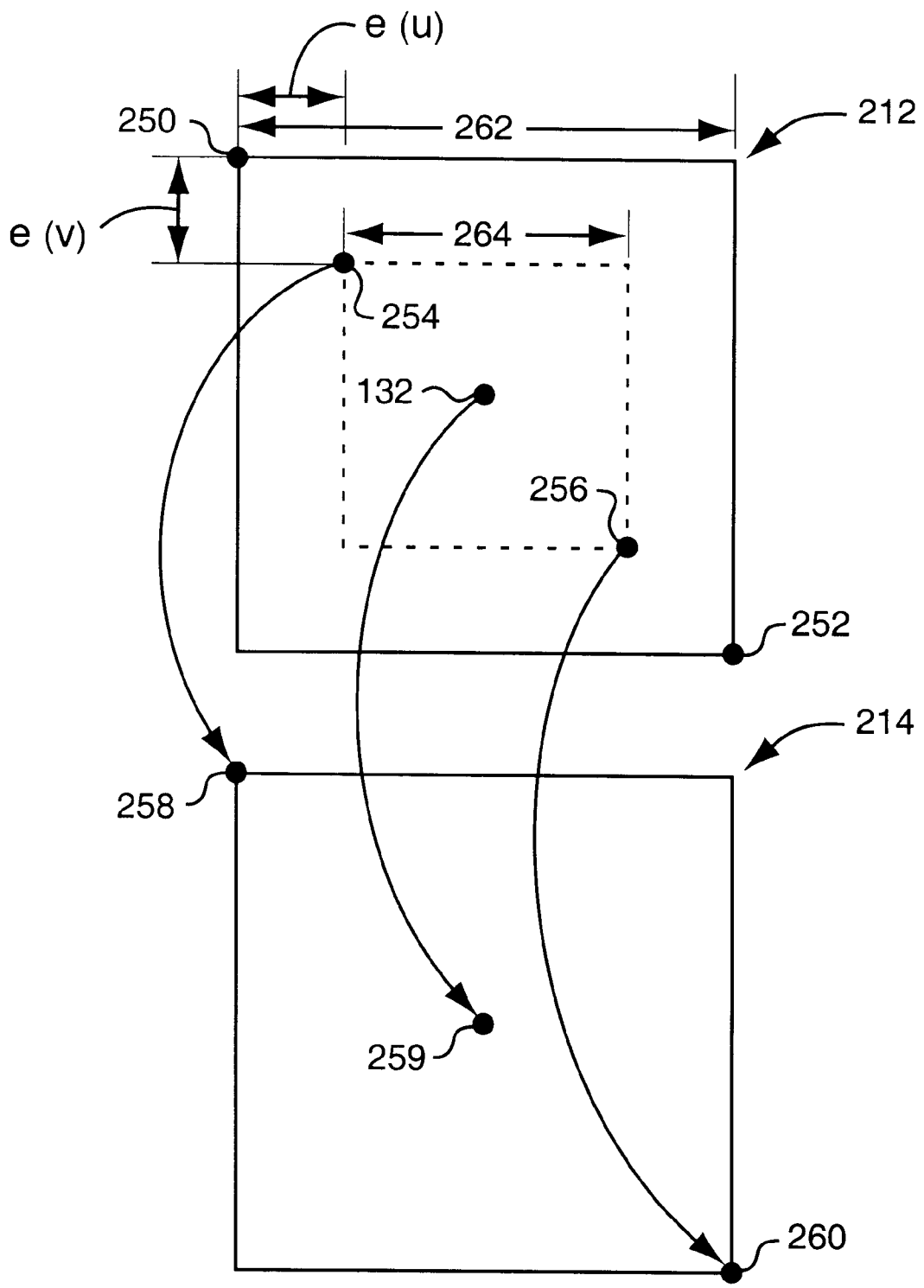
FIG. 6 is a graphical representation of warping of a far focal image so as to correspond to a near focal image, according to the invention.

FIG. 6 depicts the image translation and scaling performed in warping a far focal image to correspond to a near focal image according to the invention. In FIG. 6, far focal image 212 is processed into warped far focal image 214, in accordance with FIGS. 1, 2, 4 and 5.

At the upper left corner (origin) 250 of image 212, equations 2A and 2B, along with the method of blocks 308 and 316 of FIG. 4, are used to compute correspondence error e(u) and e(v). A new pixel is computed by interpolation at point e(u), e(v) 254 in image 212, and the pixel value is stored in image 214 at the upper left corner (origin) 258 of warped image 214. Likewise, the correspondence error computed at image 212 lower right corner (extent) 252 is used to interpolate a pixel at point 256, stored in image 214 at the lower right corner (extent) 260. Note that the error e(u), e(v) computed at point 252 is exactly squal to the error at 250 but oppos ite in sign. From the foregoing, it can be seen that the dimension u_extent 264 in FIG. 6 is equal to dimension x_extent 262, minus twice the error e(u), i.e.:

$$u\_extent = x\_extent - 2e(u) \quad (3)$$

Also, it can be seen from FIG. 6 that the scale factor and translation (u_offset, v_offset) from image 212 to image 214 are given by equations 4A, 4B, and 4C:

$$scale\_factor = x\_extent/u\_extent \quad (4A)$$

$$u\_offset = e(u) \quad (4B)$$

$$v\_offset = e(v) \quad (4C)$$

In FIG. 4, mapping is performed on a point-by-point basis to directly drive the resampling process. Using the scale factor and translation found in conjunction with FIG. 6, it is also possible to describe a second preferred embodiment wherein resampling is performed without recalculating the mapping at each step, thereby improving efficiency.

In the second preferred embodiment of the invention, the correspondence error e(u), e(v) is found for the origin point (0,0) 250 of the image 212 using the steps in blocks 300, 302, 308, and 316 of FIG. 4. From FIG. 6 and equations 4B, and 4C, it can be seen that the point 254 thus found at (e(u), e(v)) in the far focal image 212 specifies where the first point to be resampled is located. Further, equation 4A gives the scale factor between the unwarped 212 and warped 214 images. Since a reverse mapping is being employed here, where points in the input image 212 are located in order to progressively write the output pixels of the output image 214 on-grid, the inverse of the scale factor specifies the exact distance between progressive points needed in the input image 212. In other words, the inverse scale factor relates the distance between successive output pixels (unit distance) to the distance between corresponding pixels in the input image 212. Thus, it is possible to generate the needed input coordinates for resampling by simply starting at u_offset, v_offset and progressing incrementally by 1/scale_factor. This process is repeated in scan-line (u then v) order until all points x,y in the output image 214 have been generated. For example, for s=1 mm and d =100 mm, and for images 1000 pixels in width and height, the starting value of (u,v)=(5,5), and 1/scale_factor=0.99. Then, input pixels will be interpolated in the order (5, 5), (5.99, 5), (6.98, 5) . . . , (5, 5.99), (5.99, 5.99), (6.98, 5.99). Thus blocks 308 and 316 in FIG. 4 may be replaced by blocks which simply perform incremental addition of 1/scale_factor to v and u respectively. This gives precisely the same result as generated using FIG. 4. The process of reading pixels in the neighborhood of (u,v) and interpolating a pixel for writing to the output image are identical to FIG. 4 blocks 310, 318, 320, and 322.

Many other embodiments of the invention are possible. For example, available image warping hardware can be used to accelerate the translation and scaling of focal images, using equations 4A, 4B, and 4C above to specify the translation and scaling required. Such hardware is available in the form of integrated circuit components, and also as complete systems (adapter boards) suitable for use in personal computers. Another possible embodiment would use more sophisticated resampling methods instead of the bilinear interpolation described above. For example, cubic convolution can be used to interpolate new pixels centered within a 16 pixel neighborhood. When properly tuned, this method produces slightly less image blurring than bilinear interpolation, at the cost of increased computation. The advantage of improved image fidelity may not be realized, however, when the resampling method is evaluated in the context of source focal images of limited high frequency content.

Other modifications and implementations will occur to those skilled in the art without departing from the spirit and the scope of the invention as claimed. Accordingly, the above description is not intended to limit the invention except as indicated in the following claims.

What is claimed is:

1. A method for obtaining a range image using depth from focal gradient analysis, the method including:

acquiring a near reflectance image;

using a focus operator to obtain a near focal image;

acquiring a farther reflectance image;

using a focus operator to obtain a farther focal image;

warping the farther focal image so as to decrease correspondence error of the farther focal image with respect to the near focal image, thereby providing a warped farther focal image; and range normalizing the near focal image and the warped farther focal image so as to provide a range image.

2. The method of claim 1, wherein warping includes scaling the farther focal image and translating the farther focal image.

3. The method of claim 1, wherein warping includes scaling the farther focal image.

4. The method of claim 1, wherein warping includes mapping and resampling.

5. The method of claim 4, wherein mapping includes locating a point in an input image which corresponds to a particular point to be generated for inclusion in an output image.

6. The method of claim 5, wherein the point in the input image is at an off-pixel-grid location.

7. The method of claim 5, wherein the point in the input image is at a pixel-grid location.

8. The method of claim 4, wherein resampling includes interpolation.

9. The method of claim 5, wherein resampling includes reading four pixels from an input image.

10. The method of claim 8, wherein interpolation is bi-linear interpolation.

* * * * *